United States Patent [19]

Snyder

[11] Patent Number: 4,469,303

[45] Date of Patent: Sep. 4, 1984

[54] VIBRATION ISOLATION APPARATUS

[75] Inventor: Robert K. Snyder, Anoka, Minn.

[73] Assignee: Rosemount Inc., Eden Prairie, Minn.

[21] Appl. No.: 454,318

[22] Filed: Dec. 29, 1982

Related U.S. Application Data

[63] Continuation of Ser. No. 242,137, Mar. 9, 1981, abandoned.

[51] Int. Cl.³ .............................................. G01F 15/08
[52] U.S. Cl. ...................................... 248/634; 248/638
[58] Field of Search ................... 73/430; 248/638, 634; 324/125; 267/153, 140.5

[56] References Cited

U.S. PATENT DOCUMENTS

| | | | |
|---|---|---|---|
| 1,792,872 | 2/1931 | Saurer | 248/638 |
| 2,891,744 | 6/1959 | Hirst et al. | 248/638 |
| 2,962,304 | 11/1960 | Lung | 267/153 |
| 3,066,905 | 12/1962 | Gertel | 248/638 |
| 3,625,466 | 12/1971 | Marshall et al. | 248/638 |
| 3,995,724 | 12/1976 | Katzer | 188/165 |
| 4,270,625 | 6/1981 | Nishimura et al. | 248/638 |

FOREIGN PATENT DOCUMENTS

| | | | |
|---|---|---|---|
| 586517 | 11/1959 | Canada | 248/634 |
| 153733 | 7/1938 | Fed. Rep. of Germany | 248/634 |
| 1136743 | 9/1962 | Fed. Rep. of Germany | 248/634 |
| 2620162 | 11/1977 | Fed. Rep. of Germany | 248/634 |
| 2807160 | 8/1979 | Fed. Rep. of Germany | 248/638 |
| 2050235 | 8/1971 | France | 248/358 R |
| 684030 | 12/1952 | United Kingdom | 248/634 |
| 835141 | 5/1960 | United Kingdom | 248/634 |

Primary Examiner—Gerald Goldberg
Assistant Examiner—John E. Chapman, Jr.
Attorney, Agent, or Firm—Kinney & Lange

[57] ABSTRACT

An improved apparatus for supporting a sensor housing on a surface to which vibrations are applied having mounts fixedly coupled to the surface and brackets fixedly coupled to the housing with a vibration isolation material supported between the mounts and the brackets to improve the vibration isolation to the housing by placing at least one half of the material of the apparatus in compression responsive to linear vibrations along at least two of the axes of the housing.

10 Claims, 5 Drawing Figures

VIBRATION ISOLATION APPARATUS

This is a continuation of application Ser. No. 242,137, filed Mar. 9, 1981, now abandoned.

BACKGROUND OF THE INVENTION

1. Field of the Invention

The application of various sensor technologies to vehicles in motion such as aircraft, air vehicles and space vehicles as well as to other surfaces exposes the sensors to vibrations. These vibrations are defined as the continuous and non-continuous, periodic and non-periodic accelerations which result in changes in displacement about the fixed axes of the sensors. Such vibration when coupled to the sensor may cause undesirable effects to the information provided by the sensor, as by masking and altering the signal therefrom. In the case of a sensor which oscillates at a frequency responsive to a selected parameter to be sensed, vibration from such external surface may alter or fully obscure the oscillation responsive to the selected parameter. Such vibrations may be linear and/or rotational. Where the sensor is sensitive to certain of such vibrations, the sensor must be isolated from those vibrations in order to obtain intelligible information therefrom. A vibrating sensor member, such as used in a vibrating wire or beam sensor, for example, may be sensitive to all external linear vibrations and to external rotational vibrations perpendicular to the longitudinal plane of such vibrating member.

2. Prior Art

In the prior art, elastomeric material such as rubber in various forms are known vibration isolators. Similarly, it is known that placement of elastomers about the periphery of a sensor housing having a vibration sensitive sensor therein reduces the effects of certain vibrations. For example, in the prior art mounting shown in FIG. 1, rubber columns 4 are mounted on the front and rear facing sides of the housing, these columns are then rigidly affixed to a selected surface to support the housing in a desired position. When a linear vibration acts on the surface and is transmitted to the housing through the elastomeric material along the X axis of the housing, two columns are in compression and two columns are in tension. However, a vibration acting force along the Y axis or the Z axis causes all four columns to be in shear. Due to the very nature of the elastomer, it tpyically provides a stiffer response in compression (or tension) than in shear. Additional columns only add cost and provide further coupling means for the unwanted vibrations to the housing. Linear vibrations along the Y and Z axes are isolated by the system of FIG. 1, but rotational vibrations caused by the movements in direction along the stiff linear axis X provides additional problems as such linear vibrations about X can be converted to moments causing rotational vibration C about axis Z. The structure of FIG. 1 is effective only partially against rotational vibrations C about the Z axis, as the four columns are in a combination of shear and compression or tension in response to such vibration. As fully explained herein, the result of this invention is that improved isolation from such rotational vibration is obtained when all four columns are primarily in compression or tension. The center of gravity of the housing and the elastic center of the isolation system should be concentric, as otherwise the eccentricity of these centers together with the linear accelerations provide the moment arm for forces derived from such linear vibrations which are then converted to rotational vibrations which are also are unwanted.

SUMMARY OF THE INVENTION

The instant invention provides apparatus and a method of linear vibration isolation without converting the linear vibration to angular vibration by placing the elastic material outboard of the housing and skewed therefrom to place at least one half of such columns of elastic material in compression responsive to linear vibrations along at least two axes of the housing. For an embodiment where sensor isolation is desired, where, for example, the sensor is sensitive to linear and certain angular accelerations, this simple, relatively inexpensive solution reduces linear vibration in all three axes of the housing, improves the reduction over known methods by reducing angular acceleration about a desired axis of the sensor housing by placing the elastic material of all columns in compression or tension. Further, the angle at which the material is skewed from the axes of the housing also can partially compensate for eccentricity of the sensor and the housing centers of gravity or for sensor asymmetry.

DESCRIPTION OF THE PREFERRED EMBODIMENTS

A preferred embodiment according to the present invention is shown generally at 10. An enclosed housing to be isolated and which preferably is a sensor housing comprising a sensor and other components such as mounting components and transducer components is shown at 20. Housing 20 is formed in a conventional manner preferably from a metal material.

Figure 1:
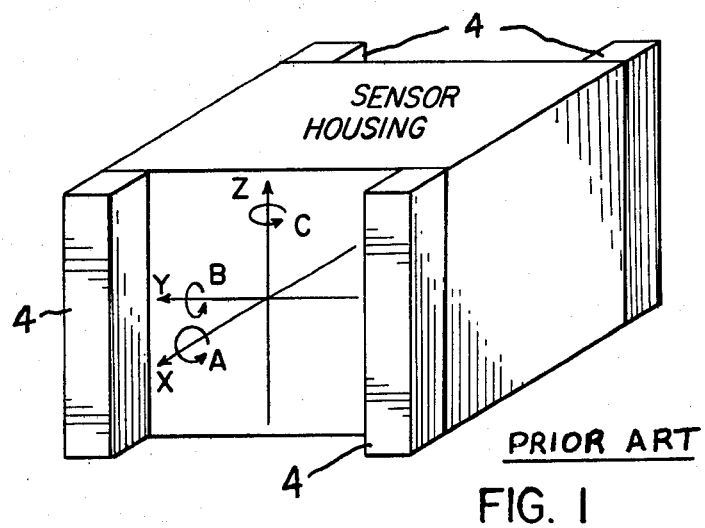
FIG. 1 is an oblique view of a prior art vibration dampening scheme.
Figure 2:
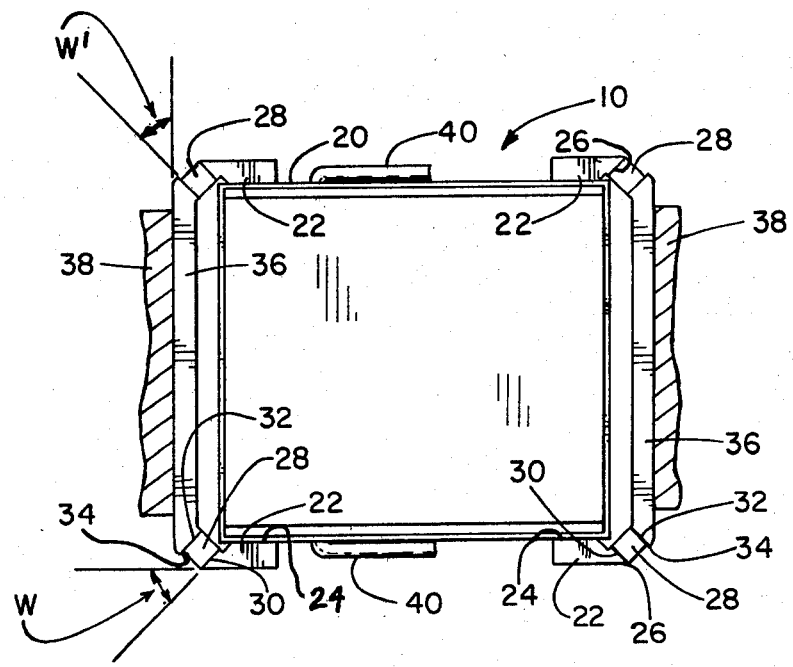
FIG. 2 is a top plan view of a housing and the improved vibration isolation apparatus showing its relationship to a supporting surface, such as an instrument housing for an air vehicle from which the housing is to be isolated.
Figure 3:
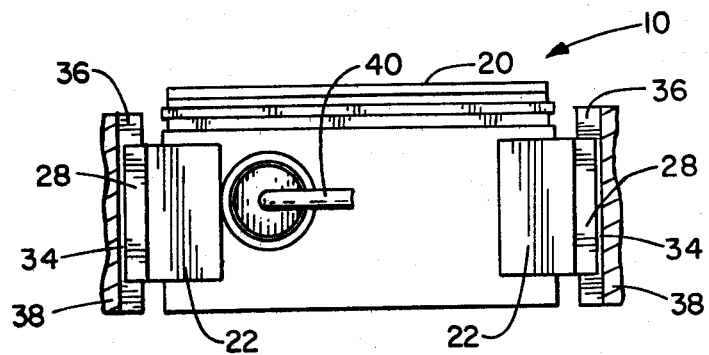
FIG. 3 is a side view of the housing, apparatus and supporting surface of FIG. 2.
Figure 4:
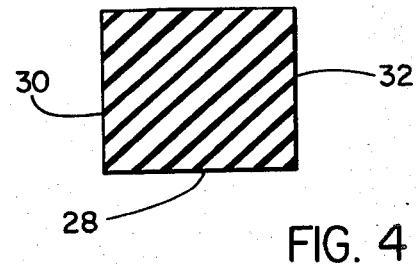
FIG. 4 is an enlarged cross sectional view of the elastic vibration isolation means of the apparatus of FIGS. 2 and 3.

Brackets 22, which may be formed when housing 20 is made as by forging and machining, or which preferably are formed separately as from a metal or other suitable material and then attached to the housing by welding, brazing or other known mounting techniques, are fixedly coupled to housing 20 at a first surface 24 of brackets 22. A second surface 26 of brackets 22, which preferably is chamfered consistent with the geometric shape of the housing, which in a preferred embodiment of FIGS. 2 and 3 is a rectangular parallelepiped, is chamfered at an angle W with respect to one of the axes (as shown in the Y axis) which preferably is between thirty five degrees to fifty five degrees but preferably is forty five degrees when the sensor is symmetric and when the sensor is located in the center of housing 20. In one preferred embodiment of FIGS. 2 and 3 an angle W of forty nine degrees was used to adjust for symmetry. An elastic block of material 28 also shown in FIG. 4, which may be columnar and preferably is a rectangular parallelepiped, is formed to conform to surface 26 at a first edge 30 and is supported on surface 26 and preferably is bonded thereto by a suitable bonding agent. Elastic material 28 preferably is formed from a highly dampened silicone rubber, or an elastomeric material preferably Hidamp (Registered Trademark of Barry Controls) as manufactured by Barry Controls, Watertown, Mass.

A second edge 32 of material 28 is also formed to conform to and be supported by one end 34 of mount 36. End 34 is also chamfered, but at angle W' with respect to the X axis; W' is also in the range of thirty five degrees to fifty five degrees, and preferably is forty five degrees, but in one preferred embodiment of FIGS. 2 and 3 when W was forty nine degrees, W' was forty one degrees. By using angles of forty nine degrees and forty one degrees adjustment for sensor asymmetry was accomplished.

A plurality of sensors may be included in housing 20. In that case, the angles W and W' should be optimized to obtain the least vibration sensitivity in accord with the sensors' symmetry and the eccentricity of the sensors' centers of gravity from the housing 20 center of gravity.

It is observed then that surface 26 of bracket 22 conforms to and provides support for first edge 30 of material 28, and, similarly, that end 34 of mount 36 conforms to and provides support for second edge 32 of material 28. This lateral support on two sides of material 28, or sandwiching of material 28 between surface 26 and end 34 at the angles W and W', as desired, provides for compression of material 28 along two axis of linear vibration (that is vibrations in the plane formed by the X,Y axes) and about one axis of angular vibrations of housing 20 (here the rotational axis C). Since the two angles sum to ninety degrees material 28 is rectangular in cross section, thereby simplifying compression/stress analysis of the material 28.

Mount 36 preferably is then secured to a surface 38, such as an air vehicle frame or instrument housing frame which is subjected to vibration, as by mounting bolts and nuts, suitable bonding material or other conventional means. Conventional external coupling means, such as pressure, differential pressure, electrical and optical couplers are schematically shown at 40. It is noted that the sway space, the distance from housing 20 to the isolation apparatus, should be adequate to preclude contact therebetween during the applied vibrations. This vibration isolation apparatus with a column of elastic material 28 disposed radially outboard of at least four diametrically opposed corners has demonstrated satisfactory results in the 1G to 3G acceleration range.

Figure 5:
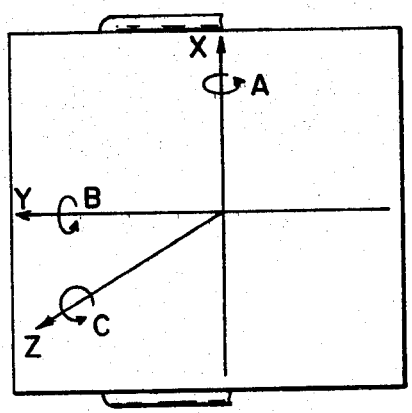
FIG. 5 is a drawing oriented to shown the linear (X, Y, Z) and rotational (A, B, C) vibration axes of the top plan view of FIG. 2 of the housing.

In the prior art, it is known that vibration is reduced by minimizing coupling conditions in two basic ways, first by reducing the eccentricity of the elastic center of the vibration isolation system from the center of gravity of housing 20 and, second, by decoupling the six modes of vibration, that is, the three linear (X,Y,Z) and the three angular (A,B,C) vibration modes shown in FIG. 5. However, this is a difficult, complex problem often resultant in complex, expensive solutions. In the case of a sensor sensitive to all three linear accelerations and sensitive to a singular angular vibration, this inexpensive solution of positioning brackets 22, elastic material 28 and mounts 36 outboard of the four corners of housing 20 at an angle between thirty five and fifty five degrees as shown in a preferred embodiment of FIGS. 2 and 3 results in low sensitivity to at least two linear vibrations e.g. (X,Y) and a substantially reduced linear vibration conversion to angular vibration e.g. (C) as all blocks of materials 28 are compressed during each cycle of vibration.

In one preferred embodiment, when housing 20 was approximately 1.2 inches high, by 2 inches long, by 1.8 inches wide, the housing, having a vibrating member type sensor, was exposed to significant dynamic, random vibration, shock and steady state acceleration. Performance of the isolation dampening system of brackets 22, elastic material 28 and mounts 36 positioned in accord with a preferred embodiment of FIGS. 2 and 3, when +3G to −3G (positive to negative three times the forces of gravity) was applied in all three axis of housing 20, was fully satisfactory. Operation and construction of one such vibrating member is fully explained in U.S. Pat. No. 4,311,053, issued Jan. 19, 1982 and held by the same assignee as the present invention. In the tested embodiment, the natural frequency of the three linear (translational) (X,Y & Z) axes and the three rotational 16 (A, B, C) were:

| axis | X | Y | Z | A | B | C |
| --- | --- | --- | --- | --- | --- | --- |
| natural frequency (cps) | 144 | 132 | 70 | 112 | 133 | 375 |

It is seen that the rotational vibration e.g. (C) was effectively decoupled from the linear vibration e.g. (X and Y) by having a high natural frequency about C and a lower natural frequency for X and Y. This necessarily caused a lower but acceptable linear natural frequency for Z. As explained, the natural frequency of C was improved by increasing the C stiffness as all material 28 is compressed during each cycle of vibration responsive to such vibration. The shape factor (S), where S is equal to the loaded area of the elastic material 28 over the force free area, permits the ratio of elastic material 28 in compression to elastic material 28 in shear to be adjusted. As shown herein, the shape factor according to this invention is adjusted by having the material 28 at angles W and W' to yield approximately the same resonant vibration frequency for vibration along any axis of the plane formed by the two linear axes X and Y of the embodiment of FIGS. 2 and 3. Hence, the shape factor is adjusted to provide an X' and Y' axis resonant frequencies approximately equal to the X and Y axis resonant frequencies, respectively, wherein the X' and the Y' axis are rotated between thirty five to fifty five degrees from the X and Y axis respectively. When angles W and W' are forty five degrees, the resolved linear vibration force along the X axis and the Y axis causes at least two of the four elastic materials 28 to be in compression and the remaining two to be in shear, responsive to such resolved vibrational force or acceleration.

Quite obviously, this invention may be utilized with other sensors and housings and for other apparatus where vibration or acceleration control is desired. Also, it is apparent that the invention may be used to control vibration and accelerations for different axes as desired.

What I claim is:

1. An isolation apparatus for supporting a sensor housing on a surface to which linear and rotational vibrations are applied, the housing having three mutually perpendicular axes comprising:

a plurality of mounts fixedly coupled to said surface, each having at least two ends thereon;

a plurality of brackets fixedly coupled to the housing, each having at least a first surface thereon; and separate elastic means supported between each one of the mount ends and the first surface of each bracket for reducing the vibration applied to the housing;

the mount ends and first surfaces being oriented to support the respective separate elastic means relative to the housing such that the resolved vibrations along at least two of the three axis result in compression of at least one half of the quantity of elastic means and wherein the separate elastic means at the respective mount ends and first surfaces are all in compression responsive to rotational vibration about the third axis during each cycle of vibration.

2. Apparatus according to claim 1 wherein the elastic means are spaced from the housing in at least four opposite corners thereof.

3. Apparatus according to claim 1 wherein each of the elastic means has a first edge and a second edge, and wherein the two ends of the mounts, and the first surfaces of the bracket are chamfered.

4. Apparatus according to claim 3 further comprising bonding means disposed between the first surface of each of the brackets and the first edge of the respective elastic means, and between each mount end and the second edge of the respective elastic means for supporting the respective elastic means therebetween.

5. Apparatus according to claim 4 wherein the housing is a rectangular parallepiped and the chamfering is in the range of thirty five to fifty five degrees with respect to one of the at least two axes.

6. Apparatus according to claim 3 wherein the chamfering of the first surfaces of the brackets is at a first angle W with respect to one of the at least two axes and the chamfering of the corresponding one end of the mount is at a second angle W' with respect to the second of the at least two axes.

7. Apparatus according to claim 6 wherein the sensor has a center of gravity and the isolation apparatus has an elastic center and such centers are eccentric and wherein the angles W and W' are selected at least partially to compensate for such eccentricity.

8. Apparatus according to claim 3 wherein the housing is a parallelepiped having external corners thereon and at least one elastic means is disposed radially outboard of each at least four diametrically opposed corners thereof.

9. An isolation apparatus for supporting on a mounting surface a sensor housing having three mutually perpendicular axes to which external linear and rotational vibrations are applied along and about at least one axis thereby resulting in vibration components along all three axes during use comprising:

a plurality of mounts, each having at least two ends having end surfaces;

a plurality of brackets, each having at least a first surface thereon;

separate elastic material members between the end surfaces of each of the mount ends and the first surface of one bracket, respectively, for reducing the vibration applied to the housing, the end surfaces and first surfaces being generally parallel to the one axis and at acute angles with respect to the other two axes;

first means for fixedly coupling the mounts to the mounting surface, and second means for fixedly coupling the brackets to the housing, the first and second means positioning the mounts and brackets in position relative to the housing to place the end surfaces of the mounts and first surfaces of the brackets to support the elastic members relative to the housing to carry vibration components in direction along the other two axes as compression of at least one half of the quantity of elastic material in the elastic members and to carry rotational vibrations about the one axis as compression in all of the elastic members during each cycle of vibration.

10. An isolation apparatus for supporting on a mounting surface a generally parallelepiped sensor housing having three mutually perpendicular axes and having opposite ends spaced apart in direction along a first of the axes, and sides spaced in direction along a second of the axes, the first and second axes forming a plane, a third axis perpendicular to said plane, and said sensor housing having linear vibrations applied at least in directions along the first and second axes, and rotational vibrations applied around the third axis during use comprising:

a pair of mounts positioned on the mounting surface and spaced from the opposite ends of the housing, respectively, each mount having first and second ends and each end having an end surface;

a plurality of brackets mounted on the sensor housing, each bracket being adjacent a different one of the mount ends and having a first surface thereon, each first surface being parallel to the respective adjacent end surface;

separate elastic material members between each of the end surfaces of each one of the mount ends and the respective first surface of an associated bracket for reducing the vibration applied to the housing when the mounting surface vibrates, the end surfaces and the first surfaces being generally parallel to the third axis; and the end surfaces and first surfaces being positioned to support the elastic members to the exterior of the sensor housing and with the first surfaces and end surfaces positioned at an oblique angle with respect to the first and second axes, to effectively decouple the natural frequency of rotational vibration about the third axis from the natural frequencies of linear vibration along the first and second axes, and the elastic members being selected to adjust the ratio of material of each member in compression to the material of each member in shear during vibration along the first and second axes to be substantially equal and lower than the natural frequency of rotational vibration about the third axis.

* * * * *